United States Patent [19]

Mizuse

[11] Patent Number: 5,832,273
[45] Date of Patent: Nov. 3, 1998

[54] SYSTEM FOR DELETING REDUNDANT INSTRUCTIONS FROM HIGH LEVEL LANGUAGE SOURCE CODE CONTAINING IN-LINE ASSEMBLY INSTRUCTIONS

[75] Inventor: Harumi Mizuse, Tokyo, Japan

[73] Assignee: NEC Corporation, Tokyo, Japan

[21] Appl. No.: 267,911

[22] Filed: Jul. 6, 1994

[30] Foreign Application Priority Data

Jul. 7, 1993 [JP] Japan ............................ 5-167584

[51] Int. Cl.$^6$ ......................................... G06F 9/45
[52] U.S. Cl. .............................................. 395/709
[58] Field of Search ........................... 395/700, 709

[56] References Cited

U.S. PATENT DOCUMENTS

| | | | |
|---|---|---|---|
| 4,642,764 | 2/1987 | Auslander et al. | 395/700 |
| 4,667,290 | 5/1987 | Goss et al. | 395/700 |
| 5,293,631 | 3/1994 | Rau et al. | 395/709 |
| 5,339,428 | 8/1994 | Burmeister et al. | 395/700 |
| 5,418,959 | 5/1995 | Smith et al. | 395/700 |
| 5,428,786 | 6/1995 | Sites | 395/700 |
| 5,507,030 | 4/1996 | Sites | 395/800 |

OTHER PUBLICATIONS

Aho et al., "Compilers Principles, Techniques, and Tools," Addison–Wesley, 1986, pp. 40–48, 396–411, 463–508, 517, 535–546, and 562–565.

no author, "Borland C + + Version 2.0," Borland International, 1991, pp. 273–281.

*Primary Examiner*—Emanuel Todd Voeltz
*Assistant Examiner*—Peter J. Corcorani, III
*Attorney, Agent, or Firm*—Whitham, Curtis & Whitham

[57] ABSTRACT

A language processing system comprises an instruction parsing portion parsing instruction statement contained in a source program written by a high-level language and an assembler language in admixing manner, a register information discriminating portion discriminating if the instruction statement parsed by the instruction parsing portion is a register information indicative of a register value corresponding to a register operating instruction described by the assembler language, an intermediate code generating portion for generating an intermediate code of the instruction statement, a register information storage portion for storing the register information discriminated by the register information discriminating portion, a code optimizing portion for performing optimization by deleting a register operating instruction with respect to the register operating instruction code in the intermediate code when the register value indicated therein is the same as a register value indicated by an immediately preceding register information or an immediately preceding register operating instruction code, and code generating portion for generating a machine language code from the intermediate code optimized through the code optimization and outputting an object code.

4 Claims, 8 Drawing Sheets

FIG.4

SOURCE PROGRAM 401

```
void   main (void)
{
    int  a;
    int  b;
    .   .
    .   .
402— _asm{
411— MOV  RPH,#3
412— MOV  RPL,#1
       ADD  a,#5
       SKT  b,#0010B
       .
       .
404— }
       #progma ensure RPH=3 RPL=1
405— a+=b;
}
```

FIG.5

OBJECT PROGRAM 501

```
511— MOV  RPH,#3
512— MOV  RPL,#1
       ADD  a,#5
       SKT  b,#0010
       .
       ADD  a,b
```

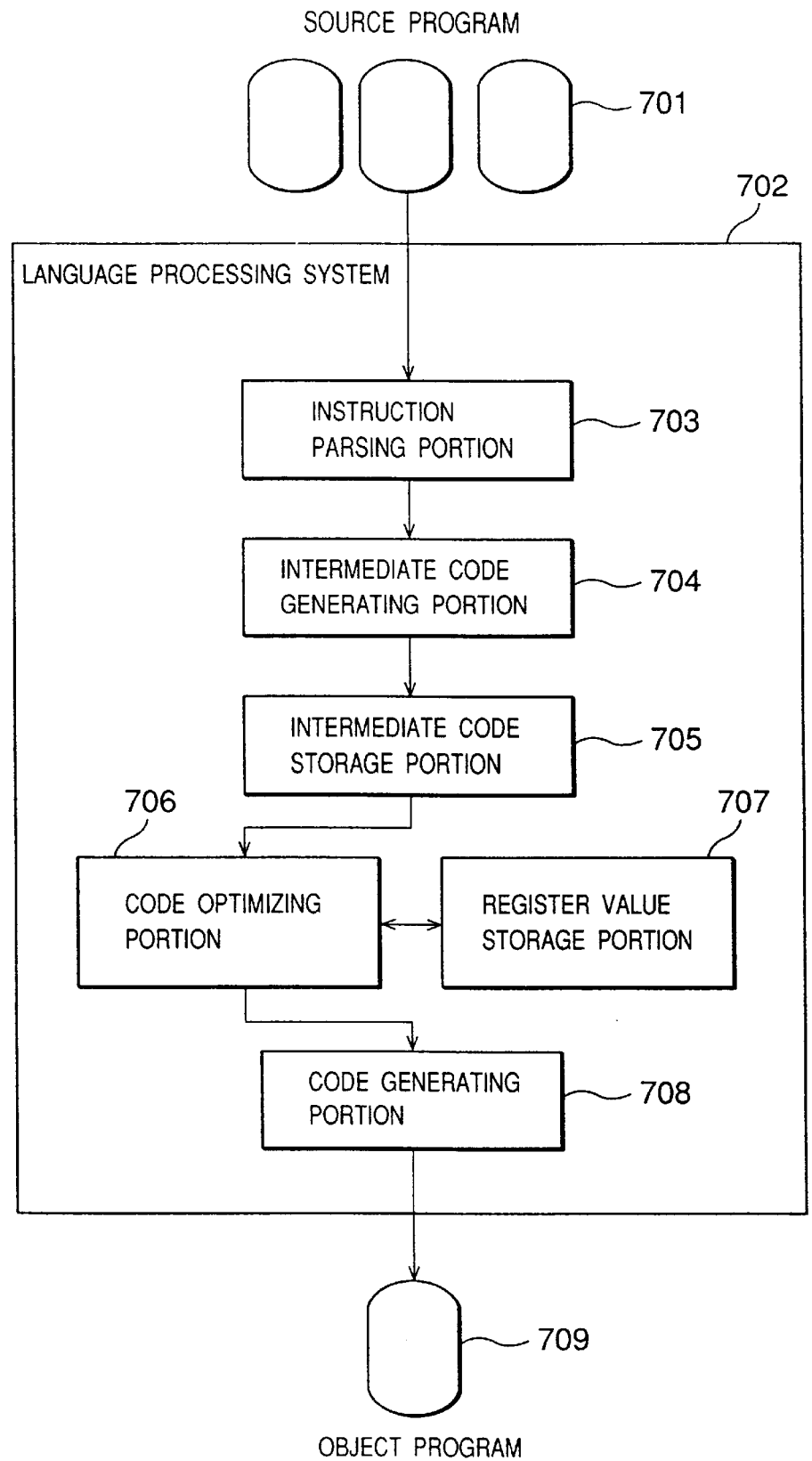

FIG.10 (PRIOR ART)

```
SOURCE PROGRAM                    1001 void    main (void)
{
    int    a;
    int    b;
    :
    :
1002 ─── _asm{
1003 ─── MOV    RPH,#3
1004 ─── MOV    RPL,#1
         ADD    a,#5
         SKT    b,#0010B
         :
         :
    }
1005 ─── a+=b;
    for(a='c';a<='z';a++)
    {
```

FIG.11 (PRIOR ART)

```
OBJECT PROGRAM                    1101

1103 ─── MOV    RPH,#3
1104 ─── MOV    RPL,#1
         ADD    a,#5
         SKT    b,#0010
         :
         :
1105 ─── MOV    RPH,#3
1106 ─── MOV    RPL,#1
         ADD    a,b
```

SYSTEM FOR DELETING REDUNDANT INSTRUCTIONS FROM HIGH LEVEL LANGUAGE SOURCE CODE CONTAINING IN-LINE ASSEMBLY INSTRUCTIONS

BACKGROUND OF THE INVENTION

1. Field of the Invention

The present invention relates generally to a language information processing system and a method for processing a language. More specifically, the invention relates to a language processing system and a method therefor to be used for code processing in a high-level language as a program language for a microcomputer.

2. Description of the Related Art

In general, as program languages for microcomputers, there is an assembler language describing in machine language (instruction) level with sufficient knowledge of the hardware construction of the microcomputer and high-level languages which performs description without not requiring extensive knowledge about the hardware construction.

In the high-level language, a compiler system make parsing of instructions read our from a program and generates a machine language in order to execute the program by the microcomputer. At this time, the compiler system simultaneously generates a machine language for register operation. Accordingly, the programmer is not required a knowledge about the type of the registers provided in the microcomputer and manner of use of the registers upon execution of the instructions.

On the other hand, an object program is generated by compiling the program prepared by the high-level language, it is possible that the instruction codes for the same process are written in redundant manner. However, a program of the size in excess of the size of a ROM installed in the microcomputer cannot run. Accordingly the object program must be as small as possible so that the program size should not exceed the ROM size. Therefore, it becomes necessary to eliminate the redundant unnecessary instruction codes. Such process detecting and eliminating the unnecessary instruction codes is referred to as optimization.

In one example of the conventional language processing system for the high-level language is illustrated in FIG. 7, in a form of a block diagram. The conventional language processing system will be discussed briefly in terms of the shown example with reference to FIG. 7.

The language processing system 702 includes an instruction parsing portion 703 for reading an instruction statement of a source program from an external storage device 710 and parsing therefor, an intermediate code generating portion 704 for generating a machine language code (intermediate code) on the basis of the results of parsing of the instruction statement, an intermediate code storage portion 705 for temporarily storing the intermediate code, an optimizing portion 708 for parsing of the intermediate code and deleting unnecessary instruction codes, a register value storage portion 707 for storing a register value which is to be made reference to during optimization process, and a code outputting portion 708 for outputting a optimized final machine language code (object code) to an external storage device 709.

Here, the optimizing portion 706 makes parsing of the intermediate code stored in the intermediate code storage portion 705 in order. When the machine code as the object for parsing is the instruction code for operating the register, the register name and its value are compared with the register value of the same register name stored in the register value storage portion 707, by the optimizing portion 706.

When the result of comparison shows that the register values are the same to each other, the instruction code as the intermediate code is deleted. On the other hand, if the register values are different from each other, the register value as the result of parsing is stored in the register value storage portion 707. In this case, the instruction code is transferred to the code outputting portion 708 from the optimizing portion 706 in the similar manner to the intermediate codes other than instruction code, and thus output to the external storage device 709 as the object code.

FIGS. 8 and 9 are flowcharts showing operational processes performed by the language processing system 703 as one example of the prior art.

At first, as shown in FIG. 8, a file containing the source program is input from the external storage device 702 (step 801). Then, the read source program is open (step 802). Then, an end code of the file is confirmed (step 803). Next, one line of the instruction statement is read from the file (step 804). The read one line of instruction statement is parsed by the instruction parsing portion 703 (step 805). The result of parsing is translated into the machine language code by the intermediate code generating portion 704 (step 806). The machine language code thus generated is stored in the intermediate code storage portion 705 as the intermediate code (step 807). The foregoing steps are repeated until the end of the file is reached (step 803).

The shown example of the conventional language processing system performs the optimization process by the optimizing portion 706 through the processes illustrated in FIG. 9.

At first, one code is read from the intermediate code stored in the intermediate code storage portion 705 (step 809). Then, the read intermediate code is parsed for checking if the currently processed intermediate code is the instruction code of the register operating instruction or other code (step 810). As a result of parsing, if the intermediate code is not the register operating instruction, the code outputting process is performed (step 814). On the other hand, if the intermediate code is the register operating instructions, the register value as a resultant value of the register operation according to the current instruction code is compared with the corresponding register value stored in the register value storage portion 707 (step 811). The content of storage related to the register in the register value storage portion 707 is the register value as a result of operation of the register by the last instruction code before the current intermediate code. If the result of comparison shows that the register values are the same, judgement can be made that the current operating instruction of the instruction code is unnecessary to delete the instruction code from the intermediate code (step 812). On the other hand, if the register values as compared at the step 811 are different from each other, the register value stored in the register value storage portion 707 is updated by the current register value as the result of operation of the register by the instruction code of the current operating instruction (step 813). Thereafter, the intermediate code is transferred to the code outputting portion 708 from the optimizing portion 706 and thus output to the external storage device 709 from the code outputting portion 708 (step 814). Then foregoing processes through the steps 809 to 814 are repeated until end of the intermediate code is confirmed. The steps from the step 808 to the step 814 is the optimization process for the intermediate code.

In the recent years, according to increasing of storage capacity and speeding up of the process, programming by high-level language is spreading.

On the other hand, by the high-level language, it becomes difficult to make detailed control, such as for input/output function of the hardware. Therefore, when it is desired to perform input/output control to partially speed up of the program, it becomes necessary to present the descriptions written in the high-level language and the assembler language in admixing manner in the program. The function to link the assembler language in the high-level language is referred to as "in-line assembler".

An example of the source program written by C-language as the high-level language and the in-line assembler language in the admixed manner is illustrated in FIG. 10. A "__asm" statement 1002 written in a function "main( )" 1000 described by C-language is a declarative statement for "in-line assembler", as shown in FIG. 10. the assembler language is written in a block defined by { } following the "__asm" statement 1002. Here, RPH and RPL used in instruction statements 1003 and 1004 indicative of register operation represent registers. The instruction statement 1005 following { } after the "__asm" statement 1002 is the instruction statement written by the C-language. As exemplified, when detailed control is required in the program written by the high-level language, such as the C-language, it is required to describe the instruction for operating the hardware by the in-line assembler.

However, the optimizing portion employed in the language processing system is not possible to parse the content of the inserted instruction statement written by the in-line assembler. Accordingly, when the instruction codes generated from the instruction statement written by the assembler language and the instruction statement written by the high-level language are redundant, such redundant instruction mode cannot be eliminated through the optimization process.

An object program 1101 obtained as a result of processing of code of the source program 1001 shown in FIG. 10 by the conventional language processing system, is illustrated in FIG. 11. As shown, for the object program 1101, the instruction statements 1003 and 1004 written by the in-line assembler in the source program 1001 are output as they are (see instruction statements 1103 and 1104). On the other hand, in the object program 1101, the instruction statement 1005 written by the C-language in the source program 1001 are output as instruction statements 1105 and 1106 through processes. The register operation changing instructions of the instruction statements 1105 and 1106 are the same as those of the instruction statements 1103 and 1104 as seen, and thus are not necessary for redundancy of the instructions. However, since the optimizing portion cannot appreciate the content of the in-line assembler language (do not perform parsing operation), the instruction statements 1105 and 1106 are left undeleted and output together with the same instruction statements 1103 and 1104.

As set forth above, in the programming by the high-level language, there is an advantage that the programmer is not required to know the state of the registers in writing the program since the hardware, particularly the registers are managed the operation thereof by the language processing system. At this time, the register operation in the object program generated at this time can be realized by minimum instruction codes as shown in the example of the prior art.

However, as shown in FIG. 11, when the assembler source is inserted in the high-level language program by the in-line assembler function for input/output control and/or partial speed-up of the program, the instruction code of the machine language generated by the system from the instruction statement of the high-level language cannot be eliminated even when the result of operation of the register by the instruction statement written by the in-line assembler and the immediately following instruction statement written by the high-level language are the same. Therefore, in such case, it has been inherent to have the redundant instruction codes. This results in unnecessarily code length. As set forth, such problem has been caused by impossibility of parsing of the content of the statement written by the in-line assembler in the language processing system for the high-level language.

In particular, in development of a program for a low end single-chip microcomputer, the period sent for reduction of the size of the object program versus the total period for program debugging becomes substantial. When the programmer performs elimination of the redundant instruction code by manual operation, huge amount of time should be required for such operation.

SUMMARY OF THE INVENTION

Therefore, it is an object of the present invention to provide a language processing system and method therefor which permits one of redundant instruction code for shortening a code length of an object program in the case where assembler source is inserted in a high-level language program by an in-line assembler function and an instruction code generated from an instruction statement of the assembler source and an instruction code generated from an instruction statement of the high-level language are redundant.

Another object of the present invention is to provide a language processing system and method therefor, which can shorten a period required for reduction of a size of the object program by automatically deleting one of redundant instruction code when an instruction code generated from an instruction statement of the assembler source and an instruction code generated from an instruction statement of the high-level language are redundant.

According to one aspect of the invention, a language processing system comprises:

instruction parsing means for inputting a source program written by a high-level language and an assembler language in admixing manner, and parsing instruction statement contained therein;

register information discriminating means discriminating if the instruction statement parsed by the instruction parsing means is a register information indicative of a register value corresponding to a register operating instruction described by the assembler language;

intermediate code generating means for generating an intermediate code of the instruction statement from the result of parsing of the instruction parsing means;

register information storage means for storing the register information discriminated by the register information discriminating means;

code optimizing means for performing optimization by deleting a register operating instruction with respect to the register operating instruction code in the intermediate code when the register value indicated therein is the same as a register value indicated by an immediately preceding register information or an immediately preceding register operating instruction code; and code generating means for generating a machine language code from the intermediate code optimized through the code optimization and outputting an object code.

In the preferred construction, the language processing system may further comprise:

intermediate code storage means for storing the intermediate code generated by the intermediate code generating means; and wherein the register information discriminating means may insert a position information of the register information to the intermediate code stored in the intermediate code storage means as the intermediate code, and store the register information in the register information storage means with establishing correspondence to the position information.

Also, the language processing system may further comprise register value storage means for storing a register value indicated by the register operating instruction code in the intermediate code to be parsed by the code optimizing means or by the register information.

In addition, the language processing system may further comprise:

intermediate code storage means for storing the intermediate code generated by the intermediate code generating means;

register value storage means for storing a register value indicated by the register operating instruction code in the intermediate code to be parsed by the code optimizing means or by the register information; and wherein the code optimizing means may store the register value indicated by the register information corresponding to the position information of the register information storage means when the position information of the register information in the intermediate code is present, and store the register value indicated by the register operating instruction code to the register value storage means when the register value indicated by the register operating instruction code when the register value indicated by the register operating instruction code in the intermediate code is different from the register value indicated by the immediately preceding register value or the register value indicated by the immediately preceding register operating instruction code.

According to another aspect of the invention, a language processing system comprises:

instruction parsing means for inputting a source program written by a high-level language and an assembler language in admixing manner, and parsing instruction statement contained therein;

register information discriminating means discriminating if the instruction statement parsed by the instruction parsing means is a register information indicative of a register value corresponding to a register operating instruction described by the assembler language;

intermediate code generating means for generating an intermediate code of the instruction statement from the result of parsing of the instruction parsing means;

register information storage means for inserting a position information of the register information to the intermediate code stored in the intermediate code storage means as the intermediate code, and storing the register information in the register information storage means with establishing correspondence to the position information; and code optimizing means for making judgement whether the position information is present or not, storing the register value indicated by the register information corresponding to the position information of the register information storage means when the position information of the register information in the intermediate code is present, and storing the register value indicated by the register operating instruction code to the register value storage means when the register value indicated by the register operating instruction code when the register value indicated by the register operating instruction code in the intermediate code is different from the register value indicated by the immediately preceding register value or the register value indicated by the immediately preceding register operating instruction code.

Preferably, the code optimizing means makes judgement whether the register value indicated by the register operating instruction code in the intermediate code is consistent with the register value indicated by the immediately preceding register information or the register value indicated by the immediately preceding register operating instruction code, deletes the register operating instruction code when the register values are consistent and otherwise stores the register value indicated by the register operating instruction code in the register value storage means.

According to a further aspect of the invention, a language processing method comprises the steps of:

instruction parsing step for inputting a source program written by a high-level language and an assembler language in admixing manner, and parsing instruction statement contained therein;

register information discriminating step for discriminating if the instruction statement parsed by the instruction parsing step is a register information indicative of a register value corresponding to a register operating instruction described by the assembler language;

intermediate code generating step for generating an intermediate code of the instruction statement from the result of parsing of the instruction parsing step;

register information storage step for storing the register information discriminated by the register information discriminating step;

code optimizing step for performing optimization by deleting a register operating instruction with respect to the register operating instruction code in the intermediate code when the register value indicated therein is the same as a register value indicated by an immediately preceding register information or an immediately preceding register operating instruction code; and code generating step for generating a machine language code from the intermediate code optimized through the code optimization and outputting an object code.

In the preferred construction, the language processing method may further comprises a step of:

intermediate code storage step for storing the intermediate code generated by the intermediate code generating step; and wherein the register information discriminating step includes a step for inserting a position information of the register information to the intermediate code stored in the intermediate code storage step as the intermediate code, and storing the register information in the register information storage step with establishing correspondence to the position information.

Also, the language processing method may further comprise a step for storing a register value indicated by the register operating instruction code in the intermediate code to be parsed by the code optimizing step or by the register information in a register value storage means. The language processing method may further comprise the steps of:

intermediate code storage step for storing the intermediate code generated by the intermediate code generating step;

register value storage step for storing a register value indicated by the register operating instruction code in the intermediate code to be parsed by the code optimizing step or by the register information; and wherein the register information discriminating step includes a step for inserting a position information of the register information to the intermediate code stored in the intermediate code storage step as the intermediate code, and storing the register information in the register information storage step with establishing correspondence to the position information; and the code optimizing step stores the register value indicated by the register information corresponding to the position information of the register information storage step when the position information of the register information in the intermediate code is present, and stores the register value indicated by the register operating instruction code to the register value storage step when the register value indicated by the register operating instruction code when the register value indicated by the register operating instruction code in the intermediate code is different from the register value indicated by the immediately preceding register value or the register value indicated by the immediately preceding register operating instruction code.

According to a still further aspect of the invention, a language processing method comprising the steps of:

instruction parsing step for inputting a source program written by a high-level language and an assembler language in admixing manner, and parsing instruction statement contained therein;

register information discriminating step discriminating if the instruction statement parsed by the instruction parsing step is a register information indicative of a register value corresponding to a register operating instruction described by the assembler language;

intermediate code generating step for generating an intermediate code of the instruction statement from the result of parsing of the instruction parsing step;

register information storage step for inserting a position information of the register information to the intermediate code stored in the intermediate code storage step as the intermediate code, and storing the register information in the register information storage step with establishing correspondence to the position information; and code optimizing step for making judgement whether the position information is present or not, storing the register value indicated by the register information corresponding to the position information of the register information storage step when the position information of the register information in the intermediate code is present, and storing the register value indicated by the register operating instruction code to the register value storage step when the register value indicated by the register operating instruction code when the register value indicated by the register operating instruction code in the intermediate code is different from the register value indicated by the immediately preceding register value or the register value indicated by the immediately preceding register operating instruction code.

In the preferred construction, judgement is made in the code optimizing step whether the register value indicated by the register operating instruction code in the intermediate code is consistent with the register value indicated by the immediately preceding register information or the register value indicated by the immediately preceding register operating instruction code, deletes the register operating instruction code when the register values are consistent and otherwise stores the register value indicated by the register operating instruction code in the register value storage step.

Other objects, features and advantages of the present invention will become clear from the detailed description given hereinafter.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 4 is an illustration showing one example of a source program list to be processed by the shown embodiment of the language processing system;

FIG. 5 is an illustration showing one example of an object program list corresponding to the source program list of FIG. 4, as processed by the shown embodiment of the language processing system;

FIG. 7 is a block diagram showing a construction of one example of the conventional language processing system;

FIG. 10 is an illustration showing one example of the conventional source program;

FIG. 11 is an illustration showing one example of the object program list corresponding to the source program list of FIG. 10.

DESCRIPTION OF THE PREFERRED EMBODIMENT

The preferred embodiment of a language processing system according to the present invention will discussed hereinafter in detail with reference to the accompanying drawings, particularly to FIGS. 1 to 6. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
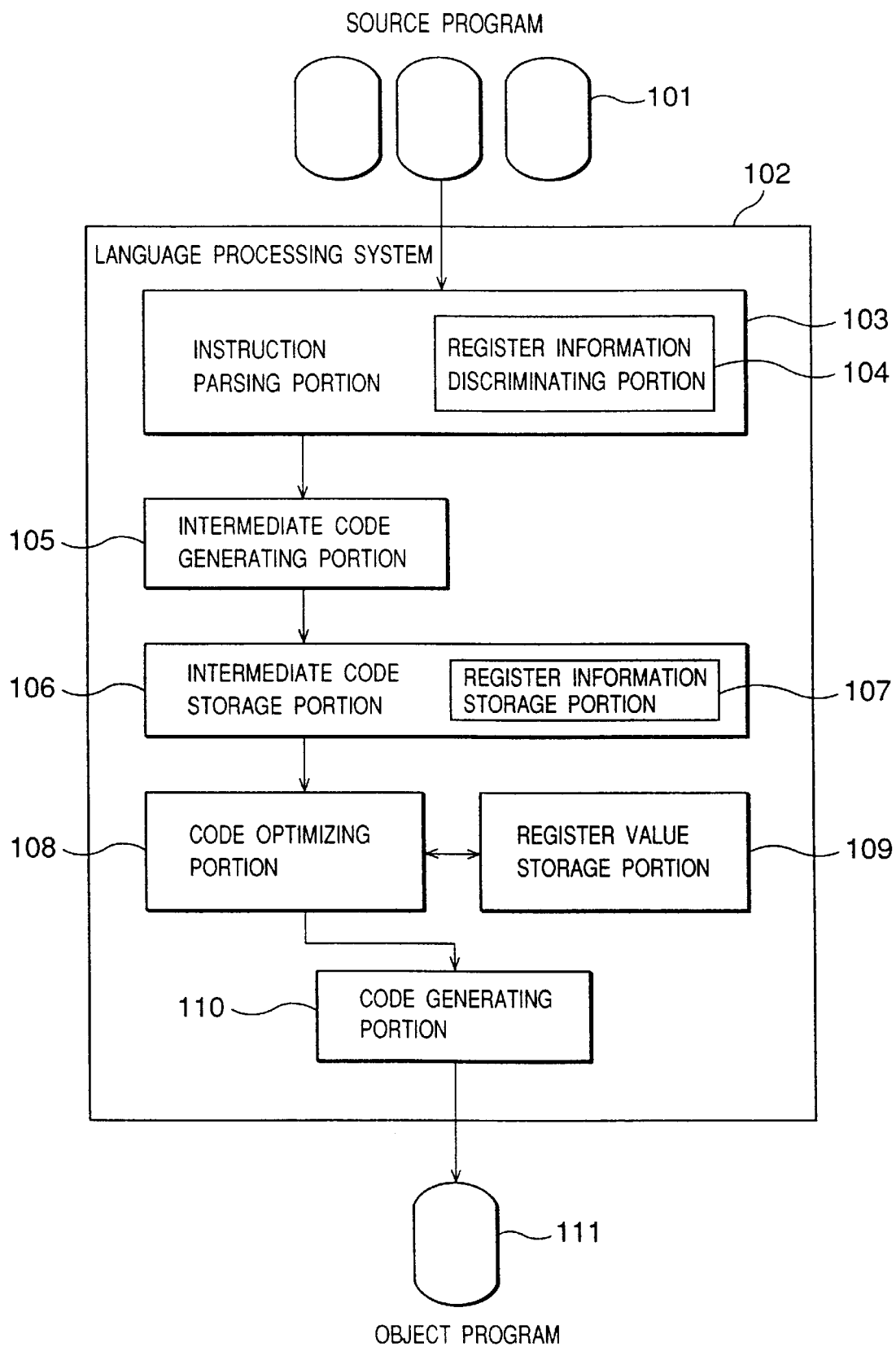
FIG. 1 is a block diagram showing a construction of one embodiment of a language processing system according to the present invention.

FIG. 1 is a block diagram showing the preferred embodiment of a language processing system according to the present invention. On the other hand, FIGS. 4 and 5 show a source program to be processed by the shown embodiment of the language processing system, and an object program generated through the process.

The preferred embodiment of the language processing system 102 includes an instruction parsing portion 103 for reading an instruction statement of a source program from an external storage device 110 and parsing therefor, an intermediate code generating portion 104 for generating a machine language code (intermediate code) on the basis of the results of parsing of the instruction statement, an intermediate code storage portion 105 for temporarily storing the intermediate code, an optimizing portion 108 for parsing of the intermediate code and deleting unnecessary instruction codes, and a code outputting portion 108 for outputting a optimized final machine language code (object code) to an external storage device 109.

As shown in FIG. 4, the source program 401 to be processed by the shown embodiment of the language processing system is described by C-language as a high-level language, for example. In the source program 401, an assembler source for designation of a register operation and so forth is inserted by a in-line assembler function in a portion within __asm{ } following an "in-line assembler" declarative statement 402. When the assembler source is inserted with the "in-line assembler" declarative statement, the assembler source is immediately followed by a register information instruction 404 designating information (register information) concerning a register name and its value so as to designate the content condition of the register in the assembler source. In the register information instruction statement 404, RPH and RPL represent register names, and figures, i.e. 3 and 1 given for respective register names RPH and RPL represent values of respective registers. It should be appreciated that the high-level language to be used for describing the source program 401 is not specified to C-language, but can be of any other high-level language, such as UNIX, COBOL and so forth.

The instruction parsing portion 103 includes a register information discriminating portion 104 for discriminating an instruction statement when the source program to be parsed, contains an instruction statement designating the register information such as the instruction statement 404 in FIG. 4. By this, in addition to parsing of the content of the instruction statement written by the high-level language of the source program, it becomes possible to discriminate the instruction designating the register information.

The intermediate code generating portion 105 generates the intermediate code on the basis of the result of parsing of the instruction statement by the instruction parsing portion 103. The intermediate code thus generated is a machine language code similar to an object code to be finally output. However, since optimization is not yet effected, the intermediate code may contain redundant instruction codes.

The intermediate code storage portion 106 includes a register information storage portion 107 for storing the register information, as the intermediate code, designated by the instruction statement designating the register discriminated by the register information discriminating portion 104, upon parsing of the instruction statement by the instruction parsing portion 103. By this, in addition to the intermediate code generated by the intermediate code generating portion 105, the register information can be stored as the intermediate code when the instruction statement designating the register information is present.

Figure 6:
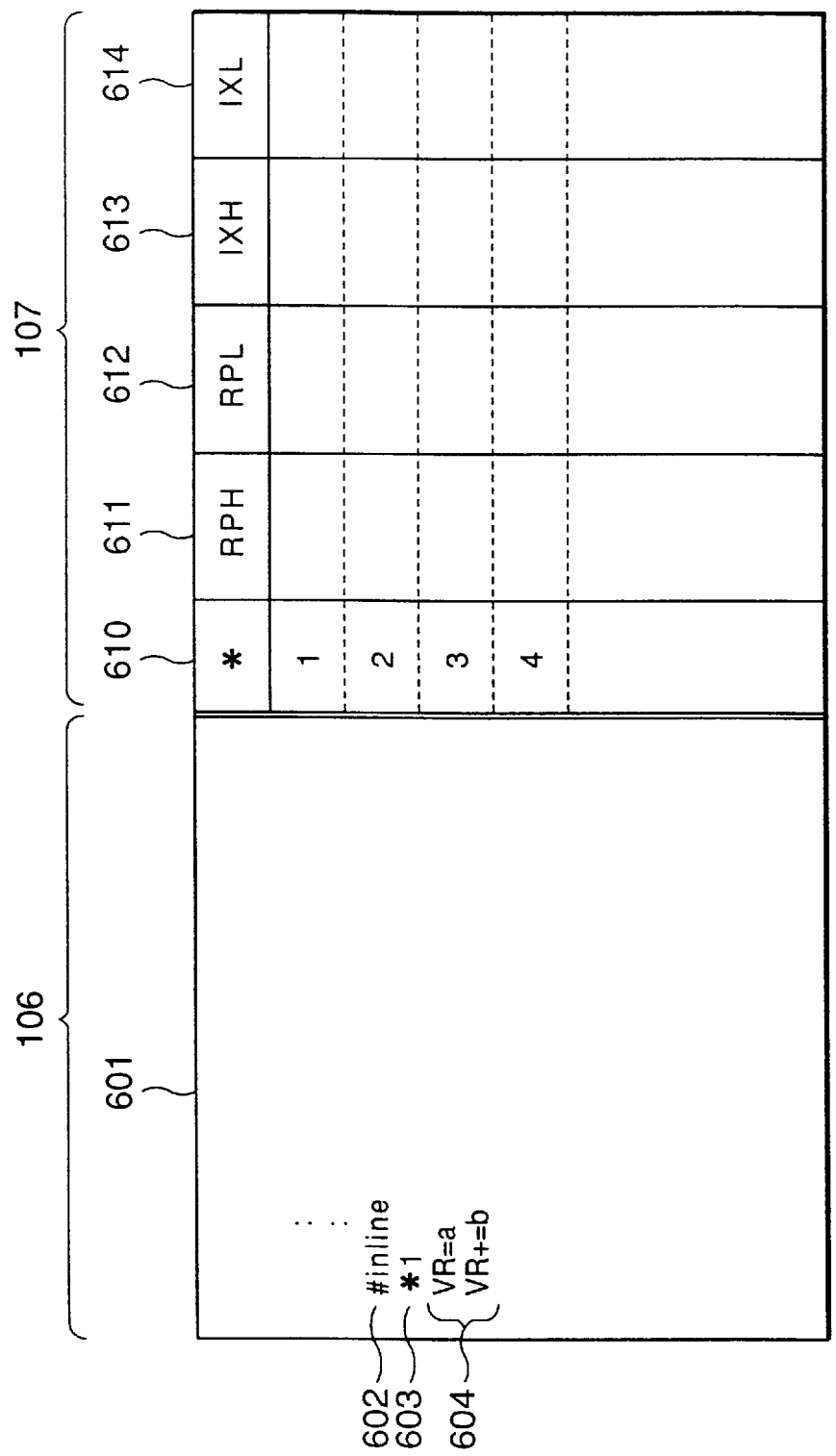
FIG. 6 is an illustration showing an example of a storage content in an intermediate code storage portion and a register information storage portion.
Figure 9:
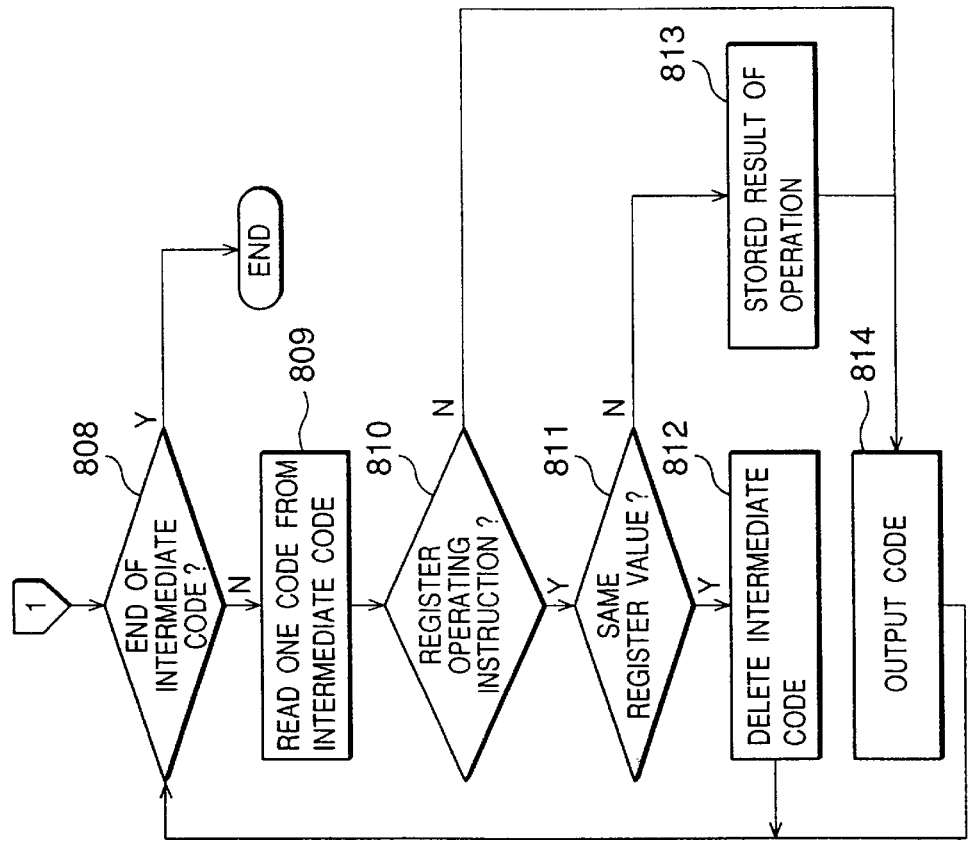
FIG. 9 is a flowchart showing a series of processes of the conventional of the language processing system up to outputting of an object program with optimizing the intermediate code.
Figure 8:
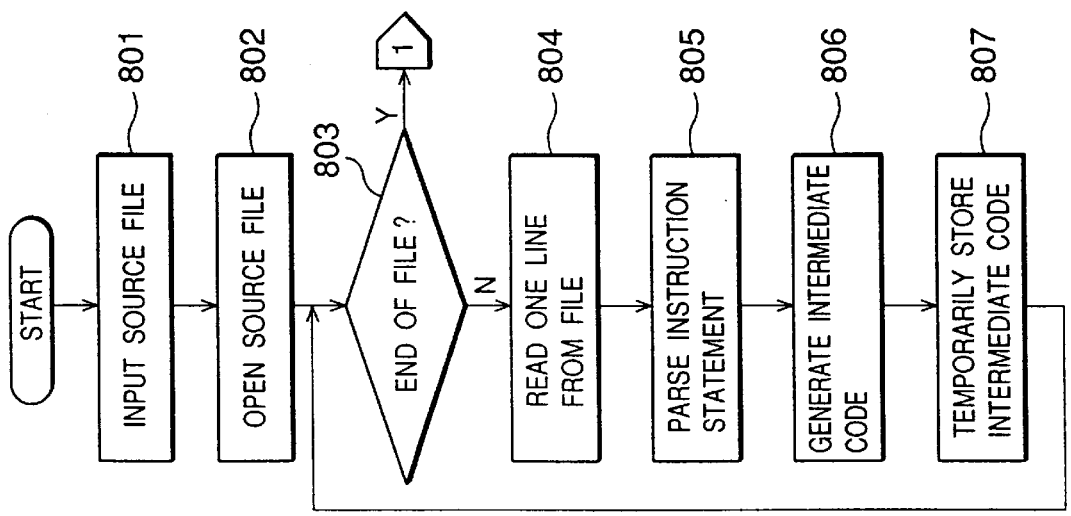
FIG. 8 is a flowchart showing a series of processes of the conventional of the language processing system up to generation of an intermediate code from a source program.

FIG. 6 shows examples of the storage content of the intermediate code storage portion 106 and the register information storage portion 107. Here, in the intermediate code 601, a reference sign 602 designates portion to insert the instruction statement written by the in-line assembler. At the position designated by the sign 602, the in-line assembler statement is inserted. It should be appreciated that it is possible to directly insert the in-line assembler statement instead of designating the position to insert by the sign 602.

A register information designating statement 603 is inserted in the source program on the basis of the register information (the instruction statement 404 of FIG. 4). A number designated by the register information designating statement 603 corresponds to each number of a number area 610 (the area indicated with *) storing number identifying register information in the register information storage portion 107. The reference numerals 611 to 614 denote areas for storing values of respective registers. Respective register value areas are labeled by the corresponding register names. In the register areas 611 to 614, the register values respectively designated by the register information instruction statement designated by the register information instruction statement. For example, assuming that the register information designating statement 603 is inserted on the basis of the register information 404 in the source program of FIG. 4, the value of the register RPH and the value of the register RPL indicated in the register information 404 are stored in the columns of No. 1 of the number area 610. The instruction statement 604 is the instruction code written by C-language.

The optimizing portion 108 parses the intermediate code stored in the intermediate code storage portion 106 and the register information storage portion 107 in order. When the intermediate code as the current object of parsing is the instruction code for operating the register, the register name and its value after register operation are compared with the register values of the same register name stored in the register value storage portion 109.

When, as a result of comparison, judgement is made that the register values are the same as each other, the current intermediate code as the instruction code is deleted. On the other hand, when judgement is made that the register values are different from each other, the value of the register as the result of parsing is stored in the register value storage portion 109.

On the other hand, when the intermediate code is the instruction statement inserted on the basis of the instruction statement designating the register information of the source program, the value of the register stored in the register information storage portion 107 corresponding to the instruction statement to the register value storage portion 109.

The code outputting portion 110 outputs the final optimized object program to an external storage device 111, in which the object program is optimized by the optimizing portion 108.

Next, the process of the shown embodiment of the language processing system according to the present invention will be discussed with reference to the flowcharts illustrated in FIGS. 2 and 3.

Figure 2:
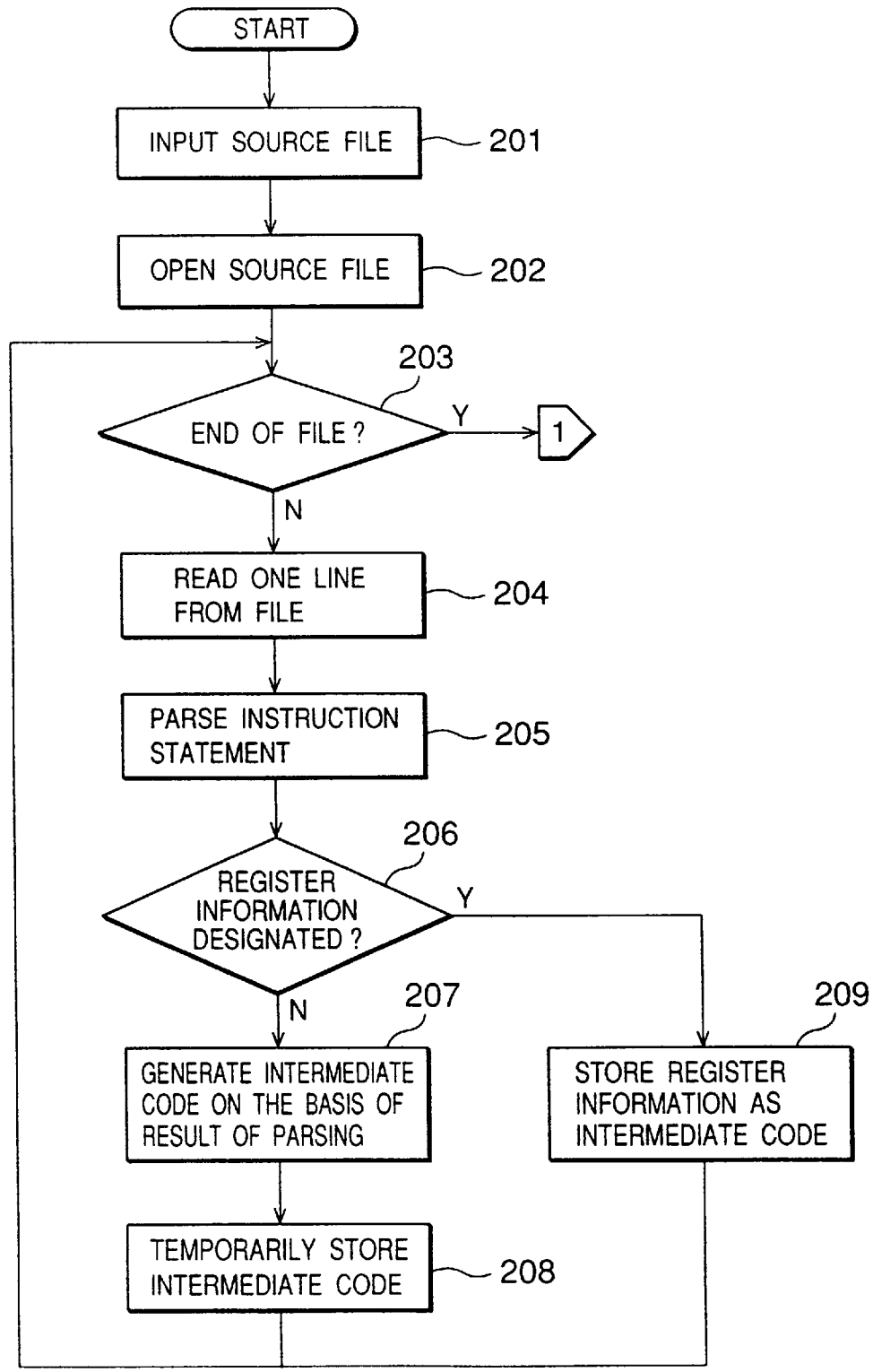
FIG. 2 is a flowchart showing a series of processes of the shown embodiment of the language processing system up to generation of an intermediate code from a source program.

At first, as shown in FIG. 2, a file containing the source program is input from the external storage device 101 (step 201). Then, the read source program is open (step 202). Thereafter, an end code of the file is confirmed (step 203). Next, one line of the instruction statement is read from the file (step 204). The read one line of instruction statement is parsed by the instruction parsing portion 103 (step 205).

Here, when the instruction parsing portion 103 makes judgement that the instruction statement as the current object for parsing is the instruction statement designating the register information, the instruction statement as the instruction statement 503 of FIG. 5 is generated as the intermediate code on the basis of the instruction statement, and the register information designated by the instruction code is stored in the register information storage portion (steps 206 and 209).

On the other hand, when the instruction statement as current object for parsing in judged as not the instruction code designating the register information, the result of parsing is translated into the machine language code by the intermediate code generating portion 105 (step 207). The machine language code thus generated is then stored in the intermediate code storage portion 106 as the intermediate code (step 208). The foregoing steps are repeated until the end of the file is reached (step 203).

Figure 3:
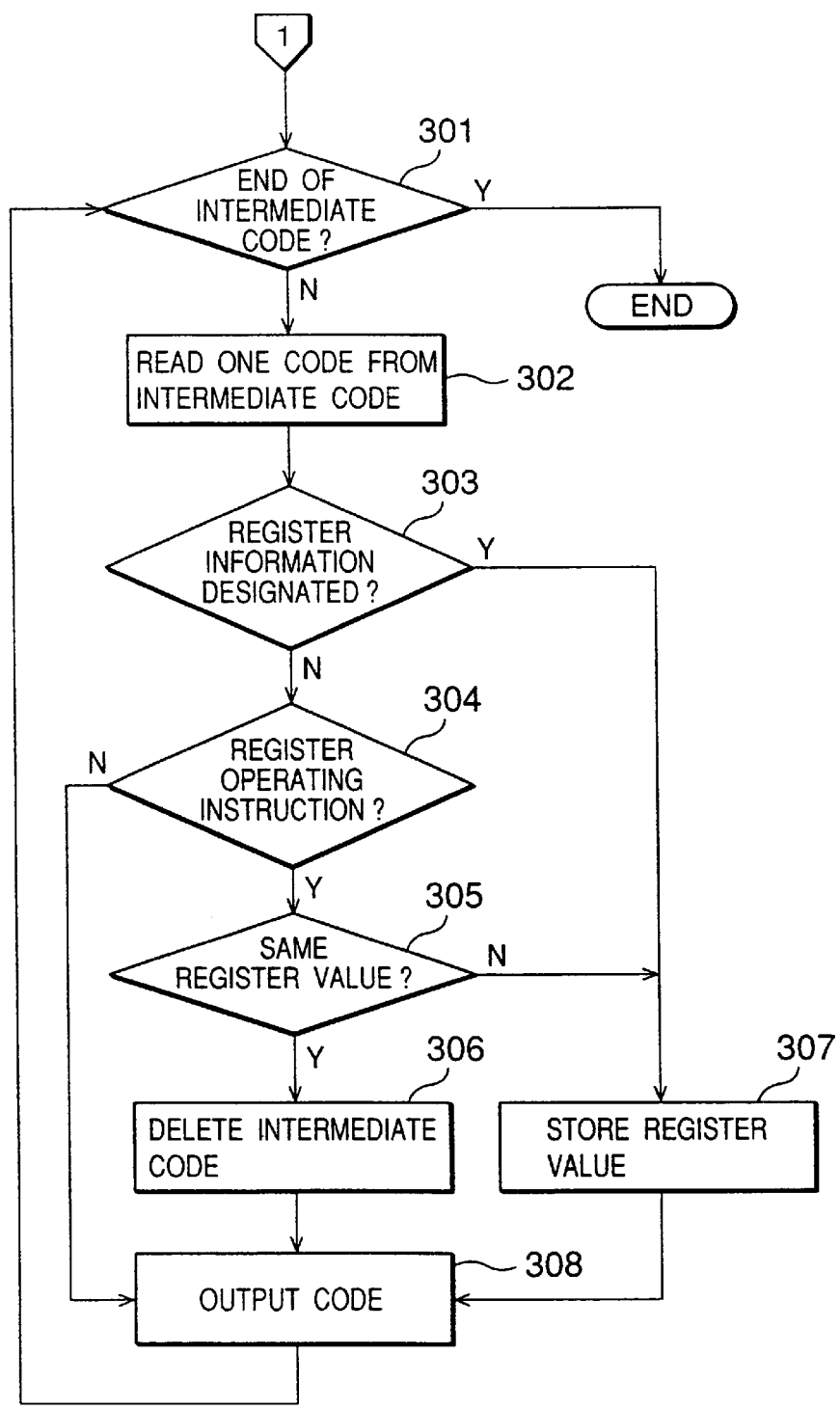
FIG. 3 is a flowchart showing a series of processes of the shown embodiment of the language processing system up to outputting of an object program with optimizing the intermediate code.

Next, the language processing system 102 performs processes set out below by the optimizing portion 108, as shown in FIG. 3.

At first, one code is read from the intermediate code stored in the intermediate code storage portion 705 (step 302). Then, the read intermediate code is parsed for checking if the currently processed intermediate code contains the designation for the register information (step 303). If the intermediate code contains the designation for the register information, the value of the register stored in the register information storage portion 107 corresponding to the intermediate code is stored in the register value storage portion (step 307).

Then, check is performed whether the instruction code of the register operating instruction is the instruction code is the register operating command or other code (step 304). If the result of checking shows that the intermediate code is not the register operating command, the code outputting process is performed (step 308). On the other hand, when the intermediate code is the register operating command, the register value after register operation is compared with the register value stored in the register storage portion 109 (step 305).

If the result of comparison shows that the register values currently compared are the same, judgement can be made that the instruction codes of the operating instructions are the same, the currently processed instruction code is deleted. On the other hand, if the register values are mutually different from each other, the content of the storage in the register value storage portion 109 is updated with the value as the result of operation of the register on the basis of the instruction code (step 307).

As set forth above, the machine language code optimized through the optimization process is transferred from the optimizing portion 108, and then output to the external storage device 111 by the code outputting portion 110 (step 308). The foregoing steps are repeated until the end of the intermediate code is reached (step 301).

FIG. 5 shows the object program 501 as output of the process for the source program 401 of FIG. 4. A "_asm" statement 1002 in the source program is the declarative statement for in-line assembler. The optimizing portion 108 of the shown embodiment of the language processing system 102 cannot effect parsing of the content of the register in the assembler statement 402. However, when the programmable is noticed the condition of the register in the assembler statement 402, and if the known register condition is given as the instruction statement designating a register information, such as that of the register information instruction statement 404, optimization process can be performed utilizing such register information. In FIG. 5, the in-line assembler statement 402 and the instruction statements 411 and 412 correspond to the in-line assembler statement 1002 and the instruction statements 1003 and 1004 of FIG. 11, respectively.

Comparing the object program 501 output through the preferred embodiment of the optimization process, with the object program 1101 output through the conventional optimization process, it can be appreciated that the instruction statements 1105 and 1106 which are presented in the object program 1101 are deleted from the object program 501. In FIG. 5, since the optimization process is performed on the basis of the register information instruction statement 404, the intermediate code corresponding to the register operating instruction statement 405 (instruction statement for performing register operation the same as that to be done by the instruction statements 411 and 412) written in high-level language and immediately following the in-line assembler statement 402, can be certainly deleted. Therefore, in the shown embodiment, no redundancy in the register operating instruction statement may occur.

As set forth above, in the prior art, the in-line assembler statement is inserted in the intermediate code as is and is not parsed, the register operating instruction statement may not be deleted even when the register operation by the register operating instruction statement generated from the in-line assembler statement and the immediately following register operating instruction statement generated from the high-level language statement are the same. In contrast, according to the shown embodiment, the redundant register operation statement can be deleted through optimization process when the register operation by the register operating instruction statement generated from the in-line assembler statement and the immediately following register operating instruction statement generated from the high-level language statement are the same on the basis of the register information by designating the condition of the register (value of the register) in the register operation by the in-line assembler statement as the register information.

As set forth above, according to the present invention, when the assembler source is inserted in the high-level language program by the in-line assembler function, and the instruction code generated from instruction statement of the assembler source and the instruction code generated from the instruction statement of the high-level language program are redundant, the redundant instruction code can be deleted to shorten the code length of the object program.

Also, according to the present invention, Therefore, when the instruction code generated from instruction statement of the assembler source and the instruction code generated from the instruction statement of the high-level language program are redundant, the redundant instruction code can be deleted automatically. Therefore, it becomes possible to shorten a period required for reducing the size of the object program. This clearly contributes for shortening of a period for developing a program.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A method for deleting redundant instructions from a source code written in a high level language comprising in-line assembly language instructions, comprising the steps of:

inputting a source file written in a high level language comprising in-line assembly language instructions pertaining to specific registers;

parsing individual instruction statements from said source file and storing as intermediate codes;

reading said intermediate codes one at a time;

determining if a specific register is designated in said intermediate code from an assembly instruction and if so, storing a register address of said designated register;

determining if an operating instruction in said intermediate code from a high-level language instruction designates a specific register address;

comparing said stored register address with said specific register address from said high-level language to identify a redundant intermediate code; and deleting the redundant intermediate code.

2. A method for deleting redundant instructions from a source code as recited in claim 1, wherein said high level language is C.

3. A method for deleting redundant instructions from a source code as recited in claim 1, wherein said high level language is COBOL.

4. A method for deleting redundant instructions from a source code as recited in claim 1, wherein said high level language is Unix.

* * * * *